United States Patent [19]

Kay et al.

[11] 4,217,217
[45] Aug. 12, 1980

[54] PH CONTROL SYSTEM FOR CARBONATED BEVERAGE PLANTS

[76] Inventors: David S. Kay, 5029 Culver, Skokie, Ill. 60076; James F. Kahle, 4N665 Country Club Dr., West Chicago, Ill. 60185

[21] Appl. No.: 964,666

[22] Filed: Nov. 29, 1978

Related U.S. Application Data

[63] Continuation-in-part of Ser. No. 700,020, Jun. 25, 1976, abandoned.

[51] Int. Cl.$^2$ .................... C02D 1/04; B01F 3/04
[52] U.S. Cl. ..................... 210/59; 210/96.1; 210/220
[58] Field of Search .......... 210/59, 60, 61, 96 R, 210/205, 207, 220, 221 R, 532 S; 261/64 R, 122

[56] References Cited

U.S. PATENT DOCUMENTS

| | | | |
|---|---|---|---|
| 1,759,334 | 5/1930 | Wilson | 210/532 S |
| 1,963,354 | 6/1934 | Currie | 210/63 R |
| 2,226,743 | 12/1940 | Riley | 210/26 |
| 2,226,958 | 12/1940 | Zahm et al. | 261/64 R |
| 2,350,111 | 5/1944 | Hood | 210/49 |
| 2,723,755 | 11/1955 | Robinson | 210/96 R |
| 2,772,779 | 12/1956 | Norris | 210/96 R X |
| 3,208,935 | 9/1965 | Nesbitt | 210/59 |
| 3,276,698 | 10/1966 | Wood | 210/220 X |
| 3,276,994 | 10/1966 | Andrews | 210/8 |
| 3,371,035 | 2/1968 | Jacobs et al. | 210/59 |
| 3,541,008 | 11/1970 | Spinola | 210/96 R X |
| 3,806,452 | 4/1974 | Walker | 210/59 |
| 3,823,728 | 7/1974 | Burris | 210/63 Z X |
| 3,851,797 | 12/1974 | Jacobs | 261/122 X |
| 3,945,918 | 3/1976 | Kirk | 210/63 Z X |

FOREIGN PATENT DOCUMENTS 2502137 7/1976 Fed. Rep. of Germany .......... 210/220

OTHER PUBLICATIONS

*Kirk–Othmer Encyclopedia of Chemical Technology*, 2d Ed., vol. 4, pp. 368 and 369.
*Kirk–Othmer Encyclopedia of Chemical Technology*, 2d Ed., vol. 21, p. 629.

*Primary Examiner*—Robert H. Spitzer
*Attorney, Agent, or Firm*—Gerald S. Geren

[57] ABSTRACT

There is disclosed herein a pH control system for alkaline wastes from carbonated beverage plants and the limitations of an equipment design and method and operation which provide maximum efficiency at minimum cost. These limitations include size and shape of the reaction vessel, the pressure of carbon dioxide and time of release, the rate of flow of the effluent and its relationship to diffuser vessel, and the size of the gas bubbles as released so as to prevent waste of the carbon dioxide in excess of 30% of the gas utilized.

6 Claims, 1 Drawing Figure

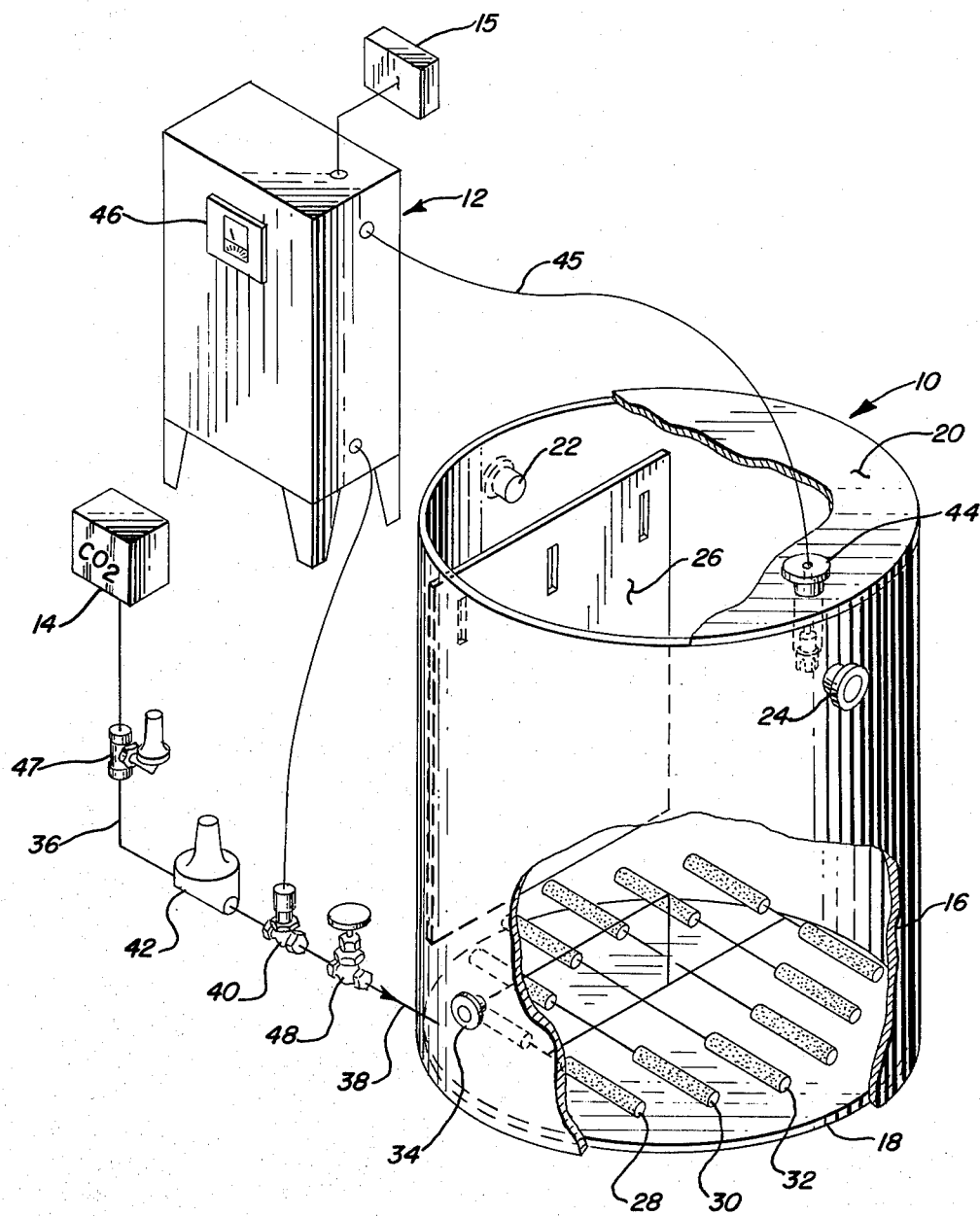

PH CONTROL SYSTEM FOR CARBONATED BEVERAGE PLANTS

This application is a continuation-in-part of our co-pending application, Ser. No. 700,020 filed June 25, 1976, now abandoned.

BACKGROUND OF THE INVENTION

This invention relates to a new, improved, and economical device for the neutralization of alkaline wastes from the carbonated beverage industry using inexpensive carbon dioxide in a non-pressure vessel.

Carbonated beverage plants are the largest users of carbon dioxide gas and, therefore, have available large volumes of this gas at costs well below that of other mineral acids such as sulfuric acid. They also must use alkaline cleaners in aqueous solution to clean the bottles or other beverage containers.

It has been conventional to discharge the alkaline waste waters into a municipal sewage system or even into a convenient body of water because the primary pollutant is only alkali resulting in a pH which varies from about 8.0 to perhaps a maximum of 13.0. One characteristic of such waste flows is that they are almost never equalized so that over a short period of time, the degree of alkalinity may vary widely.

As public concern with degrees of pollution has increased, various federal, state and local regulatory bodies have enforced definite limits as to the kind and amount of pollutants permitted in any given waste effluent. Insofar as the carbonated beverage bottling industry is concerned, the major pollutant is alkali discharged from container cleaning operations, so that a system for neutralizing the excess alkali is the major waste treatment needed.

Any acid reacting material might be used to adjust pH to any given point, but the use of carbon dioxide which, for the most part, is the cheapest acid available to the carbonated beverage industry, must be utilized under very special and efficient conditions before it can be competitive with the usual sulfuric acid systems.

It is therefore an object of this invention to provide a system for treating an alkaline waste water so as to bring the pH down to a given quality standard, thus permitting its discharge into public facilities.

It is another object of this invention to utilize carbon dioxide as the neutralizing acidic material. Still another object of the invention is to use the carbon dioxide in such an efficient system that it is the most economical acid reacting material available to the carbonated beverage industry.

It is a further object of this invention to effect this neutralization without using a closed reaction zone under pressure.

These and other objects of this invention will become apparent from the following description and claims appended thereto.

SUMMARY OF THE INVENTION

There is provided by this invention a system for treating alkaline waste water at minimum cost so as to permit its discharge into public facilities at a pH below the maximum tolerated by local ordinance. The system includes a cylindrical reaction vessel operating at atmospheric pressure and of a size which is proportional to the waste flow so as to maintain a reaction time sufficient to adjust the pH to the desired level with maximum utilization of the carbon dioxide. The system includes in the following order:

1. A source of carbon dioxide under pressure.
2. A primary pressure regulator to adjust the carbon dioxide pressure to about 100 psi.
3. An optional gas meter to measure gas flow.
4. A second pressure regulator to lower the carbon dioxide pressure from 100 psi to about 30 psi.
5. A solenoid valve to control the addition of carbon dioxide, opening or closing as actuated by the pH control sensor.
6. A globe valve to throttle the pressure of carbon dioxide to the diffuser to a pressure less than 6 psi higher than the pressure due to the height of water in the reaction tank as exerted upon the diffuser surface.
7. Ceramic (aluminum oxide) gas diffusers to introduce carbon dioxide in bubbles of minimum size and maximum active surface in sufficient amount to effect the desired neutralization and at an internal pressure less than 6 psi greater than that exerted by the height of waste water in the reaction tank.
8. A baffle plate to direct the waste flow down to the gas diffuser tubes, said baffle being equipped with slots near the surface to permit traces of floating grease or other negligible floating solids to pass directly to the exit of the reaction tank.
9. A pH probe is mounted on the reaction tank and is positioned adjacent to and at the upstream side of the exit so as to sense the pH of the exiting waste stream.
10. The probe generates an electrical signal to open and close the solenoid valve which controls the flow of carbon dioxide.
11. A control panel is included which permits the operator to set the pH control values at given points. If the pH rises above the upper set point, the solenoid valve opens to permit the flow of carbon dioxide into the reaction tank. Conversely when the pH has been lowered to the desired point, the solenoid valve closes and prevents the gas flow until needed again.
12. A pH recorder is installed so that a permanent record of pH control can be maintained.

The control system need not include each of the limitations set forth above. For example, complete utilization of carbon dioxide can be maintained by a number of systems so long as the system is operated under pressure for sufficient time to permit the neutralization to be complete. Such systems employ pressure tanks usually of large size and means for intensive agitation within the reaction zone. As a weak acid, carbon dioxide theoretically can neutralize alkaline wastes from any point above the pH of saturated carbonated water (approx. 4.0–5.0). However, the degree of alkalinity becomes a major factor. For example, sodium hydroxide at a pH of 14 will absorb carbon dioxide almost instantaneously until the pH is down to about 11. The rate of absorption then drops off sharply and continues to decrease as the pH falls.

Therefore, if one wants to neutralize such waste to a pH of 6.0 or 7.0 at atmospheric pressure, the carbon dioxide must be retained in the reaction zone for such a long time that there is excessive loss and waste of gas as well as a marked increase in the size and cost of the treatment system.

BRIEF DESCRIPTION OF THE DRAWINGS

The drawing shows the basic elements of the system including the holding tank, the control means and the source of carbon dioxide.

DESCRIPTION OF THE PREFERRED EMBODIMENT

Referring now to the drawing, it will be seen that the pH control system includes a holding tank 10, a control panel 12 and a source of carbon dioxide 14. The control panel receives its power from any standard power electrical power source 15.

In this embodiment the holding tank has a capacity proportionate to the flow, is cylindrically shaped, and includes a cylindrical sidewall 16, a bottom wall 18, and a lid 20. An inlet 22 extends through the sidewall 16 near the upper edge of the tank. An outlet 24 also extends through the sidewall and is positioned diametrically opposite the inlet and at a slightly lower position.

A vertical baffle plate 26 is secured to the inside of the tank sidewall 16. The plate lies on a chord and extends downwardly from a position adjacent the inlet 22 to a lower position relatively near the bottom wall. It will be seen that the height of the baffle plate 26 is less than the height of the sidewall 16. The plate acts to divert incoming water flow downwardly and uniformly toward the bottom wall 18.

Carbon dioxide is bubbled into the tank through a plurality of ceramic diffuser tubes, such as 28, 30, and 32, which are positioned within the tank adjacent the bottom wall 18. These tubes have a pore size of 240 microns or less and are commercially available. These tubes are all interconnected to a carbon dioxide inlet 34 which extends through the sidewall 16. Carbon dioxide flows from the carbon dioxide source 14 through the line 36, to a primary pressure regulating valve 47 to reduce the line pressure to about 100 psig and thence to a secondary pressure regulating valve 42 to reduce the line pressure to less than 30 psig and thence to a solenoid valve 40 and thence to a throttling valve 48 to reduce the line pressure to less than 6 psig and thence through line 38 to tank inlet 34.

A pH probe 44 is mounted to the holding tank 10 for sensing the pH of the treated water. In the embodiment shown, the pH probe is positioned adjacent the outlet 24 at the upstream side so as to sense the pH of the treated water exiting the holding tank. The probe 44 is connected by a pH conduit 45 to the control panel 12, which encompasses the pH control device and recorder. The probe 44 generates an electrical signal in relation to the pH of the water, which signal is conveyed to the control panel which then transmits the signal to the solenoid valve. This permits a desired pH level to be set so that if the pH exceeds the set point, the solenoid valve 40 is opened so as to permit carbon dioxide flow to the tank.

For example, a set point of 8.5 can be selected so that if the probe senses a pH of greater than 8.5, the valve 40 is opened to permit delivery of carbon dioxide. On the other hand, if the probe senses a pH of less than 8.5, the solenoid valve will be closed so as to prevent delivery of carbon dioxide. However, it should be appreciated that set points other than 8.5 can be selected.

The chart recorder 46 is included in the control panel 12 for recording pH as sensed by the probe 44 as a function of time, thereby providing a continuous record of pH level.

In operation, alkaline waste water or effluent from the beverage plant enters the holding tank through the inlet 22 and is directed by the baffle 26 uniformly downwardly toward the bottom of the tank. The water then flows across the bottom of the tank in close proximity to the diffuser tubes, such as 28, 30 and 32. As the tank fills, the water level rises to the height of the outlet 24 and exits the tank via outlet 24.

Initially, carbon dioxide flows from the source 14 through the regulator valves 47 and 42, the solenoid valve 40, and through the throttling valve 48 and thence into the diffuser tubes. The diffuser tubes break up the carbon dioxide into very small bubbles and disperse those bubbles uniformly throughout the tank. The reaction of finely dispersed carbon dioxide with the water reduces the alkalinity of the water toward the desired or set point.

The pH probe 44 senses the alkalinity of the water. In the event that the actual pH is 9.0 and the upper set point is 8.5, the probe cooperates with the solenoid valve to open the valve and permit delivery of carbon dioxide until the pH reaches the lower set point, say 8.2. When the pH reaches 8.2, the solenoid valve closes so as to prevent further carbon dioxide flow to the tank. In the event the pH then exceeds 8.5, the solenoid valve is then reopened and additional carbon dioxide flows into the tank so as to react with the waste water. The pH of the water is recorded on a strip chart recorder so as to provide a record of the changes in pH of the treated water as a function of time.

The following examples further describe the operation of the system and the limiting factors which must be controlled to obtain the desired efficiency.

Example I describes the first pilot unit tested and clearly illustrates the problems of retention time, gas loss and equipment design in atmospheric pressure systems. If the desired final pH is set at 6.0, the difficulty is several fold. For this reason, closed systems under pressure have been preferred because the carbon dioxide is retained until all the alkali has been neutralized as desired. If an open system at atmospheric pressure is used, much of the carbon dioxide can escape before the reaction is complete, thereby wasting gas at considerable expense. Attempts to prevent this waste have included the use of violent agitation to shear gas bubbles and increase the reaction surface, but the escape and waste of carbon dioxide has resulted in efficiencies of less than 50% (weight of $CO_2$ absorbed by alkaline waste divided by the weight of $CO_2$ introduced into the reaction zone).

The cheapest commercial acid normally used in such neutralizing procedures is sulfuric acid because its efficiency is 100% provided adequate agitation is employed. However, sulfuric acid is more expensive than carbon dioxide at the carbonated beverage plant because of the following:

1. The carbonated beverage industry is the largest consumer of carbon dioxide and the price to them is lower than that of sulfuric acid as delivered.
2. Eighty-eight pounds of carbon dioxide will neutralize as much alkaline waste water as 106 lbs. of commercial 66° Be sulfuric acid on a theoretical basis.
3. The storage and use of sulfuric acid requires special equipment not normally available at the bottling plant, which equipment involves additional capital investment.

4. Safety problems associated with sulfuric acid are several fold that of carbon dioxide.

The successful and economical use of carbon dioxide in the carbonated beverage industry for the neutralization of alkaline wastes was not accomplished until we tested experimental units. We have now been able to increase the efficiency of the carbon dioxide units to better than 90%.

EXAMPLE I

A rectangular tank, 7'×7' and 6' liquid depth was equipped with:
1. A baffle 7'×4' extending across the tank and down to within 3 feet of the bottom tank.
2. Ten ceramic gas diffuser tubes with average openings of 720 microns and total area of 1880 square inches were connected to a carbon dioxide source with pressure adjusted to 25 psi.
3. The pH probe was set for 8.0 just upstream from the effluent exit.
4. The flow of alkaline waste water varied from 100 gpm to 200 gpm but averaged about 175 gpm. Its temperature varied from 80° F. to 110° F.
5. The average detention time was approximately 9–10 minutes.

When this pilot unit was placed in operation, it was impossible to neutralize the alkaline waste (pH 11.7) to a pH of 8.0 even though enough gas was entering to produce turbulence. It was noted that the carbon dioxide exiting from the diffuser tubes formed large bubbles that expanded rapidly in the tepid waste as they rose to the surface. Since the pH could not be lowered to the set point pH 8.0, the system was considered to have an efficiency of nearly 0% because of the large volume of gas escaping. In fact, it was impossible to lower the pH of the waste below 10.8.

EXAMPLE II

The same unit used in Example I was modified by the addition of a high-speed propeller agitator to break up the carbon dioxide bubbles and increase the reaction surface. This helped some by lowering the pH from 11.7 to 10.4 although this improvement was considered to be negligible in view of the large volume of gas lost to the atmosphere.

EXAMPLE III

This made use of the same rectangular unit but in addition utilized an additional mechanical agitator and a second rectangular tank of the same design, the efficiency was still very poor, but the pH was lowered from 12.0 to 8.0. The improvement was due only to the doubled detention time during which the neutralization took place. A large waste of gas was still apparent.

EXAMPLE IV

The equipment used was the same as that in Example II with one major change. The diffuser tubes were changed to those of the same size but having smaller pores and the efficiency was plotted against the size of the pores in microns.

| Pore Size in Microns | % Efficiency in Use of Carbon Dioxide |
| --- | --- |
| 720 | 15 |
| 555 | 22 |
| 412 | 40 |
| 264 | 56 |
| 240 | 60 |

This example spotlights the importance of bubble size as introduced into the reaction.

In our work with the rectangular reaction vessels, it became very apparent that several factors were responsible for the poor performance. These were:
1. Size of the pores in the diffusers.
2. The pressure of the carbon dioxide within the diffuser tubes with respect to the head pressure in the reaction zone.
3. The speed with which gas bubbles rose to the escape surface as well as their size.
4. The limited size of the reaction zone because of the channeling of flow.
5. The depth of the baffle with respect to the position of the diffuser tubes.

Each of these factors were evaluated in the following pilot unit experiments in order to determine those which were indeed critical.

A large pilot unit was constructed which was cylindrical in shape having a diameter approximately equal to the water or waste depth (approx. 8 feet) and could handle waste flows from 200 to 500 gpm. The baffle was positioned along the chord and could be adjusted to any desired depth from the surface to the bottom of the tank. The diffusers were standard ceramic-type tubes and were characterized by having pores of 240 microns, wall thicknesses of $\frac{3}{8}''$, lengths of 2 feet and $2\frac{1}{2}''$ outside diameter. These were connected to a manifold extending from the baffle plate to the opposite side of the cylindrical tank and could be turned off and on manually so as to determine the number required.

In Example IV, it had been determined that the optimum pore size was in the range from 240 microns so that all subsequent examples employed diffusers of this porosity. The carbon dioxide line at a pressure of 250 psi was regulated down to a pressure which the diffusers could withstand; namely, something less than 30 psi as described in the Summary of the Invention. The pH probe was positioned just upstream from the waste exit line and could be raised or lowered to match any level of exit. It was hooked up to recorder as well as to the solenoid cutoff valve for the carbon dioxide. There was also installed a manually controlled globe valve so that the gas pressure inside the diffuser tubes could be regulated at will.

Several exit openings were installed so that the height of the waste water in the tank could be varied by opening exit lines at various heights. This enabled one to control the retention time at any given flow along with the head pressure due to waste water level. In the series of tests run in the following examples, the amount of sulfuric acid required to neutralize the feed stock to a pH of 8.0 was determined and the theoretical equivalent weight of carbon dioxide was calculated. This amount of carbon dioxide divided by the amount actually introduced to achieve a pH of 8.0 was called the efficiency of the neutralization unit.

Exerpimental work with this pilot unit indicated the importance of the following variables:

1. Flow of Effluent Waste

This was one parameter that determined reaction time for the carbon dioxide to neutralize the alkaline waste.

when the pH dropped to 8.0, the gas was stopped, and when the pH climbed to 9.0, the carbon dioxide was reintroduced. A lag of less than one pH unit was considered to be achievable on a large unit. (Refer to table of data following.)

| Example | Detention Time in Minutes | Depth of Baffle (in. from floor) | $CO_2$ Pressure in Diffuser Tubes | Pressure Difference or Drop Through Diffuser Wall | Total Diffuser Tube Surface Area | Waste Water Head Pressure Ft. × 434 psi | Efficiency % of $CO_2$ Consumed |
|---|---|---|---|---|---|---|---|
| V | 15 | 36 | 10.6 | 7.2 | 1880 | 3.4 | 22 |
| VI | 15 | 24 | 10.6 | 7.2 | 1880 | 3.4 | 40 |
| VII | 15 | 12 | 10.6 | 7.2 | 1880 | 3.4 | 64 |
| VIII | 12 | 12 | 8.6 | 5.9 | 1880 | 2.7 | 76 |
| IX | 15 | 12 | 6.6 | 3.2 | 1880 | 3.4 | 94 |
| X | 15 | 12 | 5.6 | 2.2 | 1880 | 3.4 | 96 |
| XI | 15 | 12 | 6.6 | 3.2 | 1500 | 3.4 | 90 |
| XII | 15 | 8 | 6.6 | 3.2 | 1500 | 3.4 | 96 |
| XIII | 15 | 8 | 13.6 | 10.2 | 1880 | 3.4 | 64 |
| XIV | 10 | 12 | 10.6 | 8.4 | 1880 | 2.2 | 58 |
| XV | 10 | 6 | 5.4 | 3.2 | 1880 | 2.2 | 84 |
| XVI | 10 | 6 | 5.4 | 3.2 | 1500 | 2.2 | 83 |
| XVII | 10 | 6 | 5.4 | 3.2 | 1130 | 2.2 | 78 |
| XVIII | 15 | 6 | 5.4 | 2.0 | 1500 | 3.4 | 97 |
| XIX | 15 | 6 | 3.6 | 0.2 | 1880 | 3.4 | * |
| XX | 15 | 12 | 13.6 | 10.2 | 1880 | 3.4 | 52 |

*Insufficient Neutralization

2. Depth of Baffle Plate

If the lower edge of the baffle were too far from the bottom of the cylindrical tank, the flow would tend to channel toward the exit allowing almost no time for the gas from the more distant diffusers to react. As this clearance was decreased, the flow across the diffusers was enhanced and much more of the gas was absorbed.

3. Pressure of the Gas inside Diffuser Tubes

The ceramic tubes can withstand maximum gas pressure of approximately 30 psi over the head pressure of the liquid waste.

4. Pressure Drop Through Diffuser Tubes

There is always some drop in pressure as the gas leaves the last pressure regulator and proceeds through the piping layout. Depending upon the head pressure of the liquid level (approximately 0.45 psi per foot of depth), the difference must be maintained below that which the diffuser tube can withstand. The greater the pressure difference, the larger the gas bubble entering the reaction zone.

5. Detention Time

Under reasonably constant flow of 200 gallons per minute, the 3000-gallon reaction tank provided a detention time of 15 minutes, but this could be decreased by about two minutes by lowering the exit one foot.

6. Degree of alkalinity of the Waste

As pointed out previously, a very alkaline waste will absorb carbon dioxide almost instantly, but as the liquid approaches neutrality, the rate falls off dramatically. Therefore, to neutralize an alkaline waste to about pH 8-8.5, one must employ a highly efficient system, particularly when operating at atmospheric pressure.

In an effort to define these limits and therefore limit the scope of our invention, the following several examples were run in the pilot unit maintaining the waste flow at approximately 80°–110° F. and the alkalinity in the pH range of 11 to 13. The set point was 8-9; namely, A study of the data accumulated in the pilot unit as Examples V through XX brings out, the following critical limits within which the unit should operate in order to accomplish an efficiency in excess of 70%.
1. Detention or reaction time should be at least ten minutes to lower an alkaline waste to a pH range of 8.0-9.0.
2. The entrance baffle should extend at least to within 12 inches above the level of the diffuser tubes.
3. The differential between the gas pressure within the diffuser tube and the pressure at the tube liquid interface should be less than 6 lbs. per square inch.
4. The total diffuser tube surface area expressed in square inches should be at least five times the average effluent flow as expressed in gallons per minute.
5. The reaction zone or treatment vessel should by cylindrical in order to avoid the use of mechanical agitation in addition to the normal turbulence caused by the evolution of gas. Rectangular tanks require additional mechanical agitation.

These criteria are necessary to achieve an efficiency in excess of 70% because:
1. The speed across the diffuser tube surfaces as regulated by the area of the opening under the baffle increases gas-liquid contact before the gas can rise and escape from the reaction zone.
2. A detention time of at least ten minutes is required to adjust the alkaline waste at pH above 11.5 to a pH below 9.0.
3. A pressure differential across the diffuser tubes in excess of six pounds per square inch tends to liberate bubbles of gas that are too large and offer insufficient reaction surface to achieve the desired neutralization within the detention time limits and, in addition, most gas escaped as waste gas. A pressure differential of 0.2 psi or less does not introduce sufficient carbon dioxide to effect the desired neutralization.

4. Excess diffuser area offers little advantage and a lesser area does not achieve the neutralization desired.

5. Rectangular tanks can be used as the reaction vessel but additional agitation is usually required to avoid channeling.

An option is available if small amounts of grease or floating material accumulate behind the baffle plate. Small openings can be made in the baffle near the water surface to permit these small quantities to pass through and flow directly to the exit pipe. Of course, none of the diffuser tubes should be positioned so as to permit the gas to rise to the surface behind the baffle.

In our copending application, Ser. No. 700,020, now abandoned, the general procedure for neutralizing alkaline wastes from a carbonated beverage plant with carbon dioxide on a controlled basis was described without the foregoing limitations as efficiency was not of major concern. Very large bottling plants have such an ample supply of inexpensive carbon dioxide that little attention is paid to gas wastage when such a system is employed. However, smaller companies must increase the efficiency markedly before the cost of the process is competitive with mineral acids such as sulfuric acid.

Numerous changes and modifications can be embodied into the invention disclosed herein without departing from the spirit and scope as defined by the limitations set.

What is claimed and desired to be secured by Letters Patent of the United States is:

1. A system for treating alkaline waste waters discharged from a carbonated beverage plant under atmospheric pressure so as to control the pH thereof; said system comprising:
    (a) a reaction vessel for receiving alkaline waste water and into which carbon dioxide may be introduced, said vessel including a baffle for directing liquid flow to the bottom of said vessel and an inlet and outlet means to permit a continuous flow;
    (b) a source of carbon dioxide under pressure;
    (c) means for regulating the pressure of said carbon dioxide comprising two regulator valves in series plus a throttle valve capable of adjusting the gas pressure to less than about 6 pounds per square inch;
    (d) a solenoid valve positioned downstream of the two pressure regulators for starting or stopping the flow of carbon dioxide on signal;
    (e) diffuser tube means positioned within said reaction vessel at a position substantially below said outlet means, said diffuser tube means being connected with the carbon dioxide source and serving to distribute the finely divided gas throughout the water to be treated;
    (f) means for connecting the source to the regulator valves, the regulator valves to the throttle valve, the throttle valve to the solenoid valve, the solenoid valve to the diffuser tube means; and
    (g) sensing means associated with said reaction vessel for sensing the pH of water in said vessel, said sensing means being upstream from the outlet and being further associated with said solenoid valve so as to deliver carbon dioxide into the diffuser tube means in the event that the pH exceeds a predetermined level.

2. A system as in claim 1, wherein said inlet means is at an upper position in said reaction vessel and said baffle means associated with said inlet means for directing the stream down to within at least twelve inches of the level at which the diffuser tube means are positioned.

3. A system as in claim 2, wherein said reaction vessel is cylindrically shaped, the walls are substantially straight, and said baffle means comprises a substantially vertical plate which extends across said vessel along a chord.

4. A system as in claim 1, wherein said diffuser tube means include a plurality of ceramic diffusers, having pores less than 240 microns in size and a total surface area as expressed in square inches at least five times the waste flow rate through the vessel as expressed in gallons per minute.

5. A system as in claim 1, wherein the difference in pressure from inside the said diffuser tube means to the outer surface of the diffuser tube means is less than about six pounds per square inch.

6. A method for neutralizing alkaline waste waters from a carbonated beverage plant, said method comprising the steps of:
    (a) receiving the waste water into a reaction vessel having substantially straight side surfaces and operating at atmospheric pressure, said reaction vessel including an inlet and an outlet;
    (b) delivering carbon dioxide into the inlet of said reaction vessel through diffuser tube means having pore openings of less than or equal to 240 microns, and at a pressure no greater than six pounds per square inch more than that of the waste water head pressure;
    (c) forcing the waste water down behind a baffle plate so that it passes into a reaction zone in said reaction vessel within twelve inches of the level at which carbon dioxide is introduced;
    (d) sensing the pH of the neutralized waste water at a point adjacent the reaction vessel outlet;
    (e) controlling the delivery of said carbon dioxide so as to adjust the pH downward to a predetermined level without permitting the escape or wastage of more than 30% of the carbon dioxide from the reaction vessel; and
    (f) achieving desired neutralization efficiency with a detention time of less than twenty minutes.

* * * * *